United States Patent
Cremelie et al.

(10) Patent No.: US 8,166,261 B1
(45) Date of Patent: Apr. 24, 2012

(54) SYSTEMS AND METHODS FOR SEEDING A FINGERPRINT CACHE FOR DATA DEDUPLICATION

(75) Inventors: Nick Cremelie, Ghent (BE); Bastiaan Stougie, Melle (BE)

(73) Assignee: Symantec Corporation, Mountain View, CA (US)

( * ) Notice: Subject to any disclaimer, the term of this patent is extended or adjusted under 35 U.S.C. 154(b) by 279 days.

(21) Appl. No.: 12/415,847

(22) Filed: Mar. 31, 2009

(51) Int. Cl.
- G06F 13/00 (2006.01)
- G06F 13/28 (2006.01)
- G06F 7/00 (2006.01)
- G06F 17/00 (2006.01)

(52) U.S. Cl. ............... 711/161; 711/118; 711/E12.103; 707/692; 707/698

(58) Field of Classification Search .................. None
See application file for complete search history.

(56) References Cited

U.S. PATENT DOCUMENTS

| | | | |
|---|---|---|---|
| 7,814,149 B1 * | 10/2010 | Stringham | 709/203 |
| 2004/0187075 A1 | 9/2004 | Maxham et al. | |
| 2006/0095470 A1 | 5/2006 | Cochran et al. | |
| 2008/0133835 A1 * | 6/2008 | Zhu et al. | 711/118 |
| 2010/0114833 A1 * | 5/2010 | Mu | 707/650 |
| 2010/0250858 A1 | 9/2010 | Cremelie | |

OTHER PUBLICATIONS

U.S. Appl. No. 12/415,861, filed Mar. 31, 2009, Cremelie, Nick.
U.S. Appl. No. 12/415,876, filed Mar. 31, 2009, Cremelie, Nick.
"Filter Package";(accessed on May 15, 2009); http://www.cs.indiana.edu/~rawlins/website/documentation/filter-package.html.
Klein, Amit; "OpenBSD DNS Cache Poisoning and Multiple O/S Predictable IP ID Vulnerability"; Mar. 13, 2008.
http://www.derkeiler.com/Mailing-Lists/securityfocus/bugtraq/2008-03/msg00180.html.
Atsushi, Shono et al.; "Efficient Dynamic Web Contents Delivery Method Utilizing Fingerprint Cache"; Transactions of Information Processing Society of Japan; 2005; p. 570-584.
vol. 46 No. 2; Japan; http://sciencelinks.jp/j-east/article/200504/000020050405A0133985.php.
"Caching: Work the Server and Client Side, and Everyone Benefits"; Jul. 22, 2004; Web Development.
Hartman, John H.; "SIFS"; Fall 2007; (accessed on May 15, 2009); http://www.cs.arizona.edu/classes/cs552/fall07/sifs/sifs.pdf.
Engerbretsen, Joan; "Fingerprint-based remote control for IPTV debuts"; Sep. 15, 2006; http://telephonyonline.com/iptv/marketing/remote_control_iptv_091506/.

(Continued)

*Primary Examiner* — Reginald Bragdon
*Assistant Examiner* — Eric S Cardwell
(74) *Attorney, Agent, or Firm* — Advantedge Law Group LLC

(57) ABSTRACT

A computer-implemented method for seeding a fingerprint cache for data deduplication associated with a single-instance-storage computing subsystem may comprise: 1) maintaining server-side fingerprint usage data for a plurality of fingerprints associated with data stored in the single-instance-storage computing subsystem and 2) building, based at least in part on the fingerprint usage data, a server-side fingerprint cache for use in client-side data deduplication, the server-side fingerprint cache comprising at least a subset of the plurality of fingerprints. The method may further comprise: 1) receiving a request for the server-side fingerprint cache from a client-side data deduplication computing subsystem and 2) transmitting data representative of the server-side fingerprint cache to the client-side data deduplication computing subsystem for use in client-side data deduplication associated with the single-instance-storage computing subsystem. Other exemplary fingerprint cache seeding and data deduplication methods, as well as corresponding exemplary systems and computer-readable media, are also disclosed.

17 Claims, 10 Drawing Sheets

OTHER PUBLICATIONS

Silverman, Richard E.; "Re: want to automate PSFTP, skip fingerprint cache/prompt?"; Aug. 6, 2003; http://www.derkeiler.com/Newsgroups/comp.security.ssh/2003-08/0061.html.

"Single Instance Storage in Exchange 2007"; (accessed on May 15, 2009); The Microsoft Exchange Team Blog; http://msexchangeteam.com/archive/2008/02/08/448095.aspx.

"Single Instance Storage in Microsoft Windows Storage Server 2003 R2";May 2006; Microsoft; http://download.microsoft.com/download/8/a/e/8ae7f07d-b888-4b17-84c3-e5a1976f406c/.

"Cache Purging and Seeding . . . "; Toolbox for IT Groups; http://siebel/toolbox.com/groups/technical-functional/siebel-analytics-I/cache-purgingand-seeding-1431073; Published May 2, 2009.

"Server Side Caching"; http://www.sitemasters.be/tutorials/1/1/255/Addow/Server_Side_Caching; Published Jan. 28, 2005.

"Caching: Work the Server and Client Side, and Everyone Benefits"; Web Development; http://www.fiftyfoureleven.com/weblog/web-development/caching-server-side-client-side; Published on Jul. 22, 2004.

"Configuring the OpenDS Directory Server With dsconfig"; https://www.opends.org/1.0/page/ConfiguringOpenDSUsingTheDsconfigTool; Published Jul. 11, 2008.

Smiley, John; "Installing Oracle RAC 10g Release 1 on Linux ×86"; http://www.oracle.com/technology/pub/articles/smiley_rac10gr1_install.html; Published Jan. 21, 2006.

"Cache algorithms"; Wikipedia; http://en.wikipedia.org/wiki/Cache_algorithms; Published Sep. 3, 2004.

Devera, Martin; "How to find the best VM strategy for Linux"; http://luxik.cdi.cz/~devik/bestvm.htm; Archived Jun. 4, 2002.

"Email::Fingerprint::Cache—Cache observed email fingerprints"; http://search.cpan.org/~budney/Email-Fingerprint-0.24/lib/Email/Fingerprint/Cache.pm; Archived Sep. 21, 2008.

Non-Final Office Action Received in U.S. Appl. No. 12/415,861; Apr. 29, 2011.

Non-Final Office Action Received in U.S. Appl. No. 12/415,876; Mar. 24, 2011.

Notice of Allowance received in related U.S. Appl. No. 12/415,861; Jul. 19, 2011.

* cited by examiner

SYSTEMS AND METHODS FOR SEEDING A FINGERPRINT CACHE FOR DATA DEDUPLICATION

BACKGROUND

Data deduplication is a technique that may be used to reduce the amount of storage space used in a single-instance data storage system by detecting and preventing redundant copies of data from being stored to the single-instance data storage system. For example, data deduplication is often used to reduce the amount of storage space needed to maintain backups of an organization's data.

In order to perform data deduplication, a system needs to be able to identify redundant copies of the same data. Because of the processing requirements involved in comparing each incoming unit of data with each unit of data that is already stored in a single-instance data storage system, the detection is usually performed by the system generating and comparing smaller data signatures ("fingerprints") of each data unit instead of comparing the data units themselves. The detection generally involves generation of a new fingerprint for each unit of data to be stored to the single-instance data storage system and comparison of the new fingerprint to existing fingerprints of data units already stored by the single-instance data storage system. If the new fingerprint matches an existing fingerprint, a copy of the unit of data is likely already stored in the single-instance data storage system.

Existing data deduplication techniques often require significant computing resources, especially for single-instance data storage systems storing large amounts of data and/or for requests to store large volumes of data to a single-instance data storage system. For example, existing client-side data deduplication techniques often use significant bandwidth resources to transport large numbers of queries from a client-side device to a server-side single-instance data storage system. In particular, with existing data deduplication techniques, initialization of a client-side cache to be used for client-side data deduplication may require that numerous queries be transmitted to the server-side single-instance data storage system.

SUMMARY

As will be described in greater detail below, the instant disclosure generally relates to systems and methods for seeding a fingerprint cache for data deduplication associated with a single-instance-storage computing subsystem. In one example, a method for performing such a task may comprise: 1) maintaining server-side fingerprint usage data for a plurality of fingerprints associated with data stored in the single-instance-storage computing subsystem and 2) building, based at least in part on the fingerprint usage data, a server-side fingerprint cache for use in client-side data deduplication, the server-side fingerprint cache comprising at least a subset of the plurality of fingerprints. The method may further comprise: 1) receiving a request for the server-side fingerprint cache from a client-side data deduplication computing subsystem and 2) transmitting data representative of the server-side fingerprint cache to the client-side data deduplication computing subsystem for use in client-side data deduplication associated with the single-instance-storage computing subsystem. Other exemplary fingerprint cache seeding and data deduplication methods, as well as corresponding exemplary systems and computer-readable media, are also disclosed.

In some examples, fingerprint usage data may be maintained and utilized to build one or more server-side fingerprint caches associated with a server-side single-instance data store. Each fingerprint cache may be well-initialized at the server-side and may include a set of one or more fingerprints that are likely to be used for one or more client-side data deduplication operations. When requested by a client-side data deduplication client subsystem, a relevant, well-initialized server-side fingerprint cache may be transmitted, as a whole, to the client-side data deduplication computing subsystem for use in one or more client-side data deduplication operations associated with the single-instance data store. In this or a similar manner, a well-initialized fingerprint cache likely to produce a high "hit" rate may be seeded at the server side of a data deduplication system and transmitted to one or more client-side data deduplication computing subsystem for use in client-side data deduplication operations.

By proceeding in this or a similar manner, the exemplary systems and methods described herein may reduce the demands on computing resources associated with data deduplication as compared to existing data deduplication techniques. For example, as described in more detail further below, a fingerprint cache seeded at a server side of a system may help reduce or eliminate queries that would otherwise be transmitted from client-side to server-side in order to locally initialize a fingerprint cache for use in client-side data deduplication operations.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
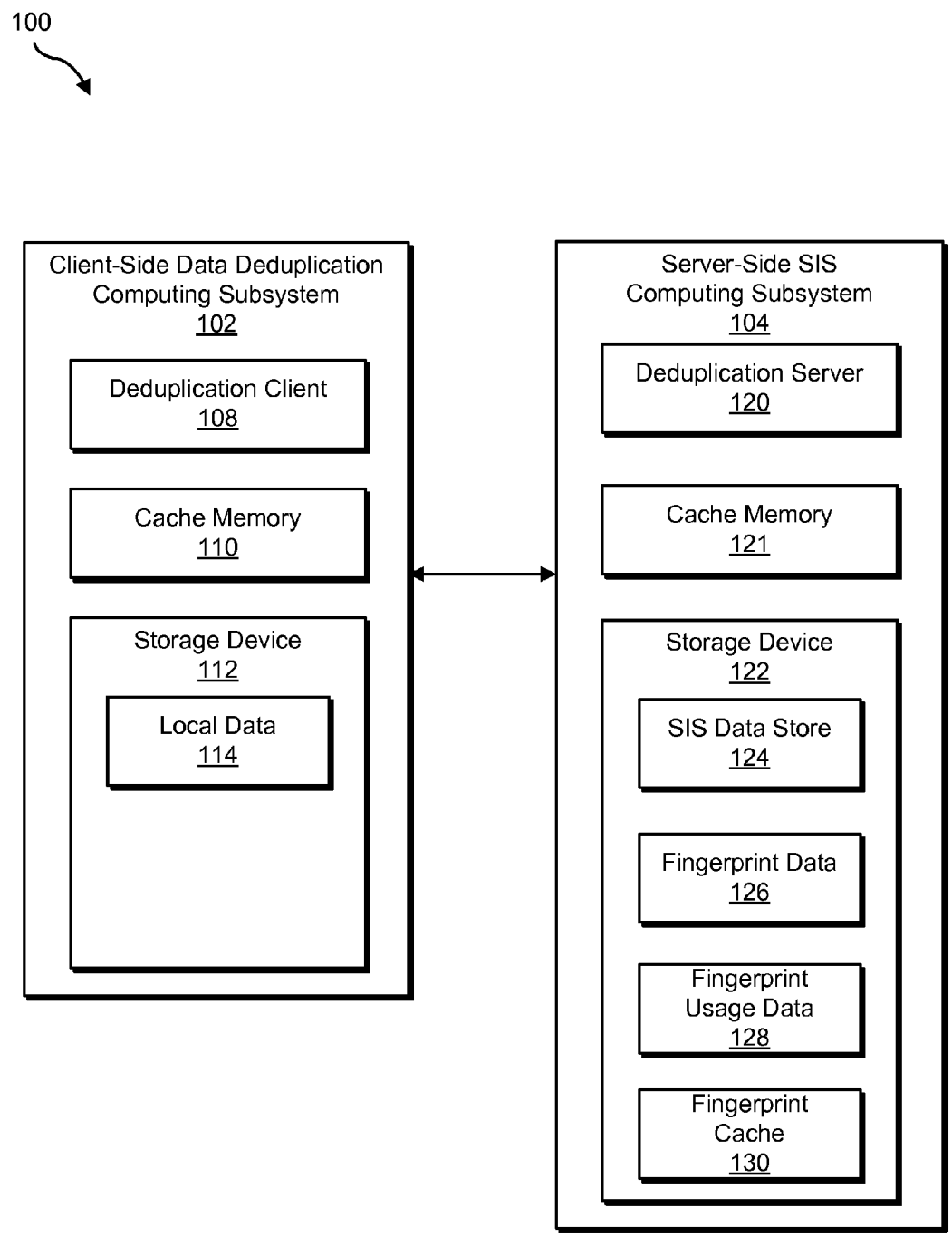
FIG. 1 is a block diagram of an exemplary system for seeding a fingerprint cache for data deduplication according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for seeding a fingerprint cache for data deduplication associated with a single-instance data storage system. As used herein, "data deduplication" may refer to one or more operations related to reducing the amount of storage space used in a single-instance data storage system, including operations for detecting and preventing data from being redundantly stored to the single-instance data storage system. A "fingerprint cache" may include a data set including one or more fingerprints descriptive of at least a portion of data stored in the single-instance data storage system. As described herein, a fingerprint cache may be built at a server-side of an exemplary data deduplication system based at least in part on fingerprint usage data and provided for use by client-side data deduplication operations.

Figure 2:
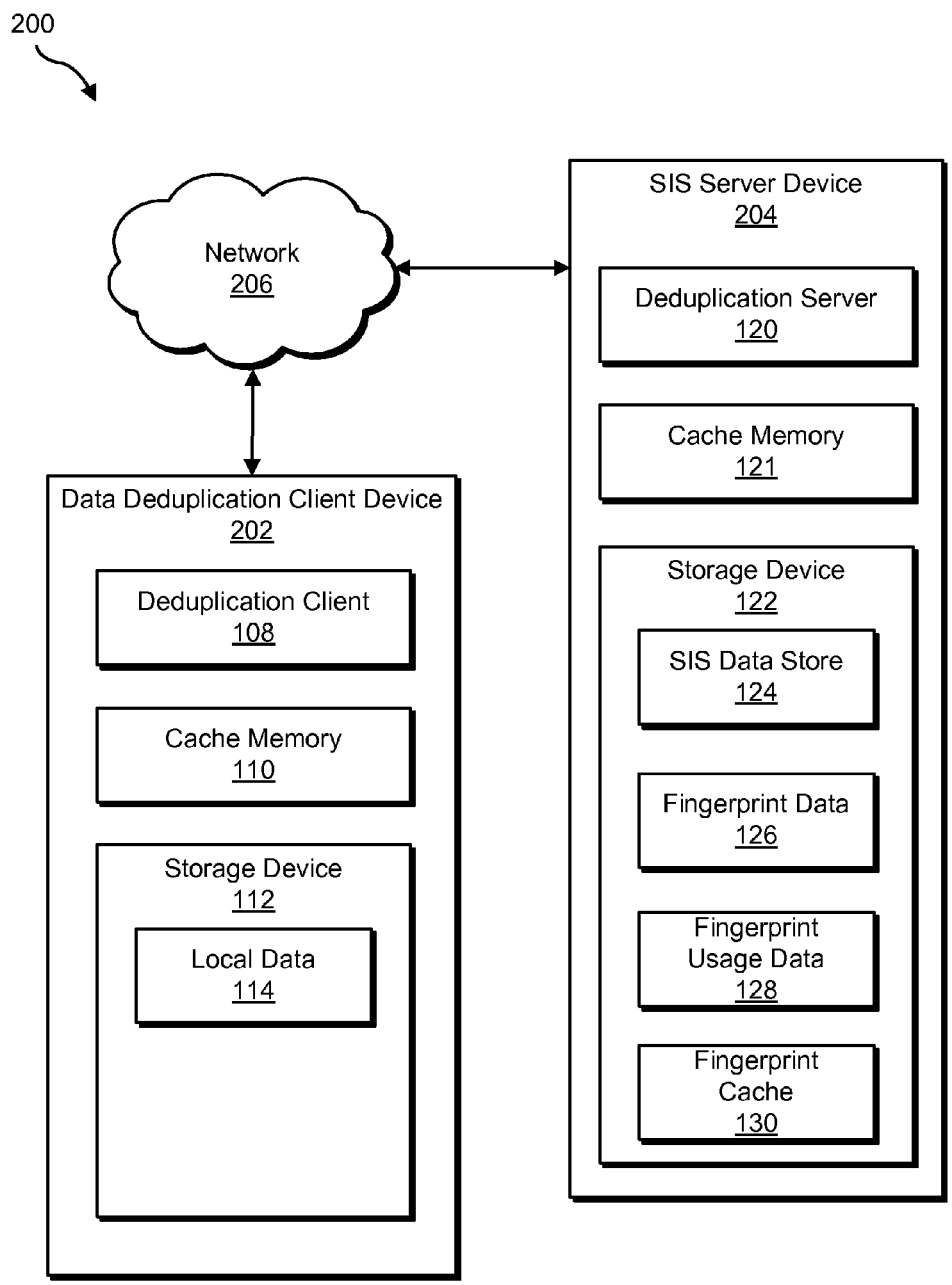
FIG. 2 is a block diagram of an exemplary implementation of the system of FIG. 1 according to at least one embodiment.
Figure 3:
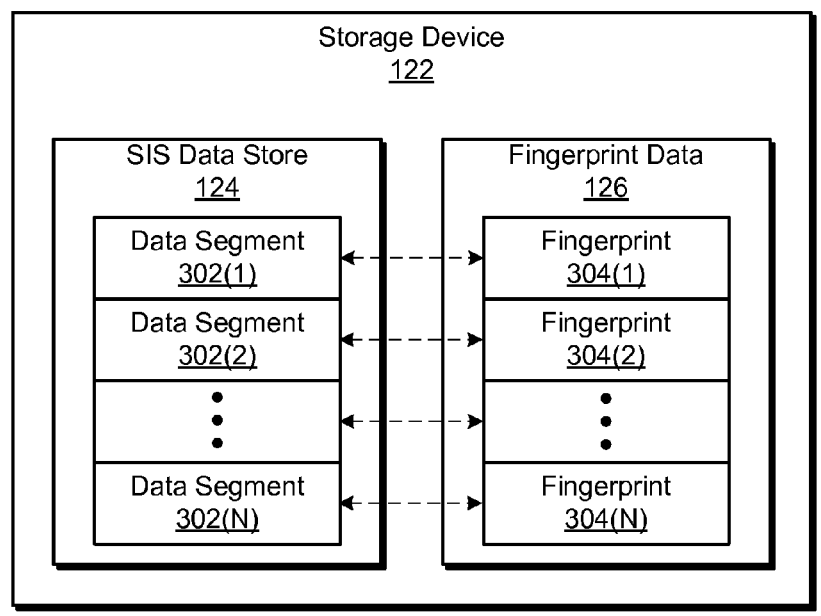
FIG. 3 is a block diagram of exemplary data segments stored to a single-instance-storage (SIS) data store according to at least one embodiment.

The following will provide, with reference to FIGS. 1-3, detailed descriptions of exemplary systems for data deduplication, particularly seeding a fingerprint cache for data deduplication. Detailed descriptions of corresponding computer-implemented methods of data deduplication and of seeding a fingerprint cache for data deduplication will be provided in connection with FIGS. 4-8. In addition, detailed descriptions of an exemplary computing system and network architecture capable of implementing one or more of the embodiments described herein will be provided in connection with FIGS. 9 and 10, respectively.

FIG. 1 is a block diagram of an exemplary system 100 for data deduplication. As illustrated in this figure, exemplary system 100 may comprise a client-side data deduplication computing subsystem 102 ("data deduplication computing subsystem 102" or simply "data deduplication subsystem 102") in communication with a server-side single-instance-storage (SIS) computing subsystem 104 ("SIS computing subsystem 104" or simply "SIS subsystem 104"). In at least one embodiment, and as will be described in greater detail below, data deduplication computing subsystem 102 may include a deduplication client 108, cache memory 110, and storage device 112 storing local data 114 (also referred to as "client-side data 114"). In addition, SIS computing subsystem 104 may include a deduplication server 120, cache memory 121, and storage device 122 including a single-instance-storage (SIS) data store 124, fingerprint data 126, fingerprint usage data 128, and at least one fingerprint cache 130.

SIS computing subsystem 104, or one or more components of SIS computing subsystem 104, may include or be implemented as hardware, computing instructions (e.g., software) embodied on at least one computer-readable medium, or a combination thereof. In one embodiment, for example, SIS computing subsystem 104, or one or more components of SIS computing subsystem 104, may include or be implemented on one or more server devices configured to communicate over a network.

Data deduplication computing subsystem 102, or one or more components of data deduplication computing subsystem 102, may include or be implemented as hardware, computing instructions (e.g., software) embodied on at least one computer-readable medium, or a combination thereof. In one embodiment, for example, data deduplication computing subsystem 102, or one or more components of data deduplication computing subsystem 102, may include or be implemented on one or more client computing devices configured to communicate over a network.

Data deduplication computing subsystem 102 and SIS computing subsystem 104 may communicate with one another using any suitable data communication protocols, media, and technologies. In at least one embodiment, data deduplication computing subsystem 102 and SIS computing subsystem 104 may communicate directly with one another. In at least one other embodiment, data deduplication computing subsystem 102 and SIS computing subsystem 104 may communicate with one another indirectly, such as via a network.

FIG. 2 is a block diagram of an exemplary implementation 200 of exemplary system 100. As illustrated in this figure, data deduplication computing subsystem 102 may include or be implemented on a data deduplication client device 202. In addition, SIS computing subsystem 104 may include or be implemented on a single-instance-storage (SIS) server device 204. Data deduplication client device 202 and SIS server device 204 may be in communication with one another via a network 206.

Network 206 generally represents any medium or architecture capable of facilitating communication or data transfer. Examples of network 206 include, without limitation, an intranet, a wide area network (WAN), a local area network (LAN), a personal area network (PAN), the Internet, power line communications (PLC), a cellular network (e.g., a GSM network), exemplary network architecture 1000 in FIG. 10, or the like. Network 206 may facilitate communication or data transfer between data deduplication client device 202 and SIS server device 204.

SIS server device 204 may include any type or form of server-side computing device capable of reading computer-executable instructions and performing one or more of the server-assisted deduplication operations and/or single-instance data storage operations described herein. Examples of SIS server device 204 include, without limitation, laptops, desktops, servers, combinations of one or more of the same, exemplary computing system 910 in FIG. 9, or any other suitable computing device configured to perform one or more of the server-assisted deduplication operations and/or single-instance data storage operations described herein.

Data deduplication client device 202 may include any type or form of client-side computing device capable of reading computer-executable instructions and performing one or more of the client-side data deduplication operations described herein. Examples of data deduplication client device 202 include, without limitation, laptops, desktops, cellular phones, personal digital assistants (PDAs), multimedia players, embedded systems, combinations of one or more of the same, exemplary computing system 910 in FIG. 9, or any other suitable computing device configured to perform one or more of the data deduplication operations described herein.

Returning to FIG. 1, components of data deduplication computing subsystem 102 and SIS computing subsystem 104 will now be described in more detail. As mentioned above, SIS computing subsystem 104 may include storage device 122, which generally represents any type or form of data storage device and/or medium (e.g., a computer-readable storage medium), such as the storage devices illustrated and described in connection with FIGS. 9 and 10. Storage device 122 may include SIS data store 124, which may comprise one or more collections of single-instance data, such as a single-instance database, for example. As used herein, "single-instance data" generally refers to non-duplicative data. Hence, SIS data store 124 may be configured to store only non-redundant instances of data.

SIS computing subsystem 104 may be configured to generate, update, and otherwise maintain fingerprint data 126 in storage device 122. The fingerprint data 126 may include one or more fingerprints associated with instances of data stored in SIS data store 124. Each fingerprint may comprise a signature or other identifier corresponding to and useful for identifying a particular instance of data stored in SIS data store 124. SIS computing subsystem 104 may generate and add the fingerprints to the fingerprint data 126 in conjunction with storage of the corresponding data instances to the SIS data store 124. SIS computing subsystem 104 may update the fingerprint data 126 by, for example, adding and/or deleting fingerprints in conjunction with storage and/or deletion of corresponding data instances in the SIS data store 124. SIS computing subsystem 104 may generate fingerprints representative of data instances in any suitable way, including, without limitation, by using a hash, checksum, or fingerprint-generation heuristic.

FIG. 3 is a block diagram illustrating exemplary data segments 302 (e.g., data segments 302(1) through 302(N)) stored in SIS data store 124 and fingerprints 304 (e.g., fingerprints 304(1) through 304(N)) included in the fingerprint data 126 and corresponding to the data segments 302. A data segment 302 generally represents any type or form of a discrete instance of data, such as a data cluster. In conjunction with SIS computing subsystem 104 storing a data segment (e.g., data segment 302(1)) to SIS data store 124, SIS computing subsystem 104 may generate and add a corresponding fingerprint (e.g., fingerprint 304(1)) in the fingerprint data 126. Thereafter, in conjunction with subsequent requests to store data to the SIS data store 124, SIS computing subsystem 104 may use the fingerprint and any other fingerprints in the fingerprint data 126 for server-assisted deduplication, including determining whether data segments in the data are already stored in the SIS data store 124.

Returning again to FIG. 1, SIS computing subsystem 104 may be configured to maintain fingerprint usage data 128 in storage device 122, including generating, updating, organizing, deleting, and otherwise managing fingerprint usage data 128 in storage device 122. Fingerprint usage data 128 may include any information descriptive of fingerprint data 126, including information descriptive of creation and historical use and/or non-use of fingerprints in relation to data deduplication operations. For example, fingerprint usage information for a fingerprint may include, without limitation, one or more identifiers of particular client subsystems and/or devices (e.g., identifiers for data deduplication computing subsystem 102 and/or data deduplication client device 202) associated with one or more fingerprints. The association of particular client subsystems and/or devices with one or more fingerprints may include, without limitation, client subsystems and/or devices that initiated data storage requests and/or data deduplication operations that caused the fingerprints to be created, modified, or updated. For example, fingerprint usage data 128 may include an identifier for a particular client subsystem and/or device that initiated a data storage request that caused one or more fingerprints to be added to the fingerprint data 126.

As another example, fingerprint usage information for a fingerprint may include, without limitation, one or more identifiers of particular data storage requests (e.g., data backup requests) associated with one or more fingerprints. The association of particular data storage requests with one or more fingerprints may include, without limitation, data storage requests that caused the fingerprints to be created, modified, or updated. For example, fingerprint usage data 128 may include an identifier for a particular data storage request that caused one or more fingerprints to be added to the fingerprint data 126.

As another example, fingerprint usage information for a fingerprint may include, without limitation, one or more identifiers of particular data selections (e.g., data selections associated with data backup requests) associated with one or more fingerprints. The association of particular data selections with one or more fingerprints may include, without limitation, data storage selections including data (e.g., data segments 302) corresponding to the fingerprints (e.g., fingerprints 304).

Fingerprint usage data 128 may also include time information associated with data deduplication operations related to fingerprints, including, without limitation, time information indicating when particular fingerprints were added to fingerprint data 126 and/or when searches were performed for particular fingerprints in the fingerprint data 126.

Fingerprint usage data 128 may also include fingerprint usage statistics, including statistics related to searches for fingerprints in the fingerprint data 126, hits produced by the searches, and misses produced by the searches. The statistics may be associated with particular client subsystems and/or devices, data storage requests, and/or data selections associated with the searches.

The above-described examples of fingerprint usage data 128 are illustrative only. Fingerprint usage data 128 may include any information descriptive of fingerprint data 126, information associating fingerprint usage data 128 to fingerprints (e.g., associating client subsystems and/or devices, data storage requests, data selections, fingerprint usage statistics, and/or other fingerprint usage information to one or more fingerprints in fingerprint data 126), information about properties of client subsystems and/or devices (e.g., a type operating system running on a client, a company department (e.g., finance, legal, engineering department) associated with a client), information associating such properties with one or more fingerprints (e.g., fingerprints that are common to a particular operating system type), and any other information that may be useful for seeding a fingerprint cache.

SIS computing subsystem 104 may maintain fingerprint usage data 128 in any manner that makes fingerprint usage data 128 potentially useful for seeding a fingerprint cache for data deduplication. Maintenance of fingerprint usage data 128 may include updating the fingerprint usage data 128 in response to data deduplication operations, including adding, deleting, and modifying information included in the fingerprint usage data 128. Such updates may be performed in any suitable way, including granularly for low-level data deduplication operations and/or globally for high-level data deduplication operations.

Figure 4:
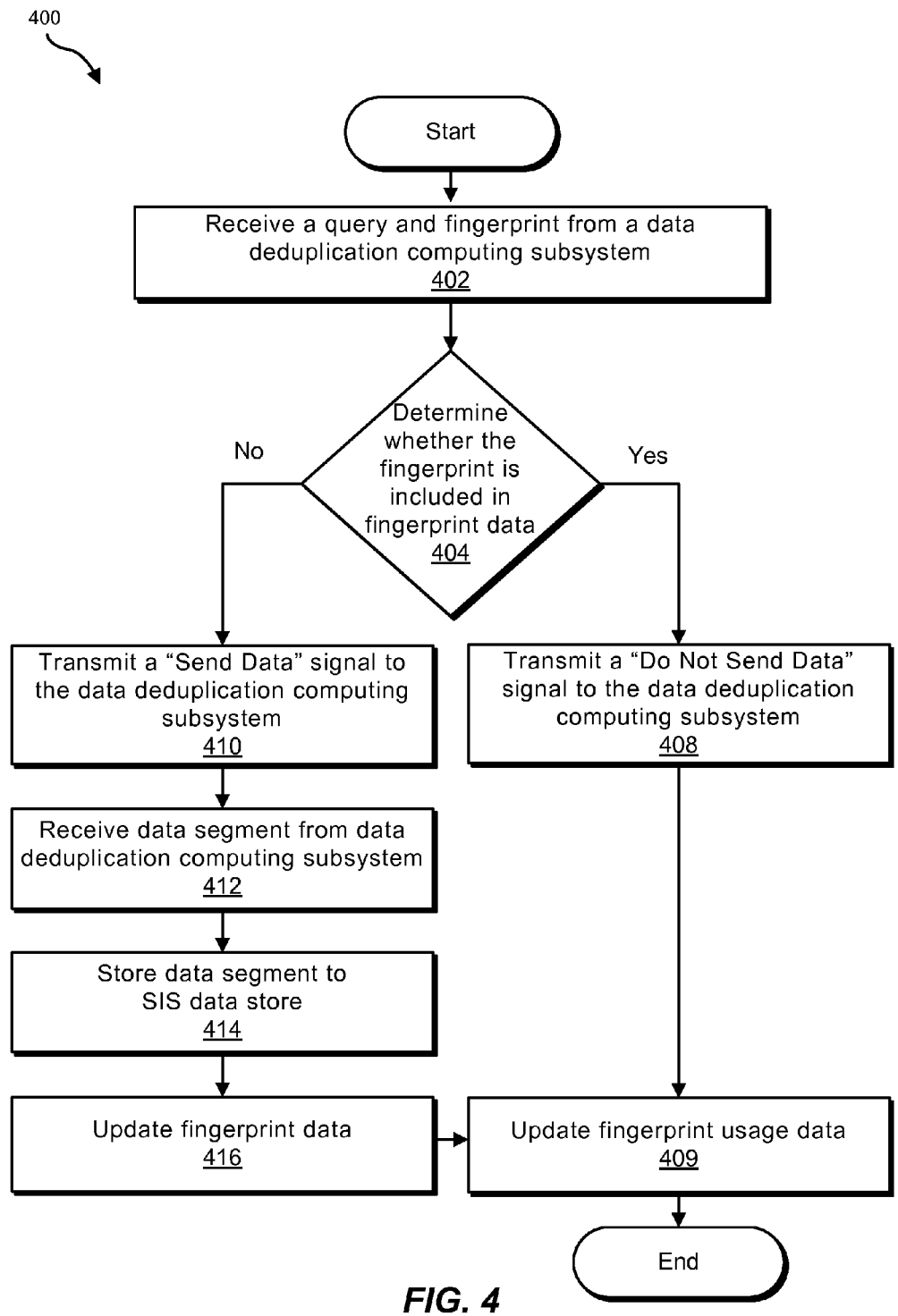
FIG. 4 is a flow diagram of an exemplary server-assisted deduplication method according to at least one embodiment.

As an example of maintenance of fingerprint usage data 128 in conjunction with data deduplication operations, FIG. 4 is a flow diagram of an exemplary server-assisted deduplication method 400. While FIG. 4 illustrates exemplary steps according to one embodiment, other embodiments may omit, add to, reorder, and/or modify any of the steps shown in FIG. 4.

As illustrated in FIG. 4, at step 402 a query and fingerprint may be received from a data deduplication computing subsystem. For example, SIS computing subsystem 104 may receive data representative of the query and fingerprint from data deduplication computing subsystem 102 (e.g., over network 206). The fingerprint may correspond to a data segment, and the query may represent a request to use the fingerprint to determine whether the data segment is already included in SIS data store 124.

At step 404, a determination may be made as to whether the fingerprint is included in the fingerprint data 126. For example, SIS computing subsystem 104 may determine whether the fingerprint is included in the fingerprint data 126, such as by searching the fingerprint data 126 for a fingerprint matching the fingerprint received in step 402.

If the fingerprint is determined to be in the fingerprint data 126 at step 404, a "Do Not Send Data" signal may be transmitted to the data deduplication computing subsystem 102 at step 408. For example, in response to this determination, SIS computing subsystem 104 may automatically transmit the "Do Not Send Data" signal to the data deduplication computing subsystem 102. In response, data deduplication computing subsystem 102 will not send, and SIS computing subsystem 104 will not receive or store to the SIS data store 124, a duplicate copy of the data segment corresponding to the fingerprint.

At step 409, fingerprint usage data 128 may be updated. For example, SIS computing subsystem 104 may update fingerprint usage data 128 to include information descriptive of or otherwise associated with the search for the fingerprint in the fingerprint data 126 at step 404. For example, the fingerprint usage data 128 may be updated to include information about the search for the fingerprint in the fingerprint data 126, information about a data storage request that caused the search to be performed, information about a data selection (e.g., a set of data being backed up) associated with the request, information about a client-side subsystem and/or device associated with the request (e.g., an identifier for data deduplication computing subsystem 102), statistical information related to the search for the fingerprint in the fingerprint data 126 (e.g., add a "hit" to statistical information for the fingerprint), and/or any other information related to the use of the fingerprint. The method 400 may then end, and may be repeated for another query and fingerprint corresponding to another data segment.

Returning to step 404, if the fingerprint is determined not to be in the fingerprint data 126, a "Send Data" signal may be transmitted to the data deduplication computing subsystem 102 at step 410. For example, in response to this determination, SIS computing subsystem 104 may automatically transmit the "Send Data" signal to the data deduplication computing subsystem 102. In response, data deduplication computing subsystem 102 may send the data segment corresponding to the fingerprint to the SIS computing subsystem 104 for storage in SIS data store 124.

At step 412, the data segment may be received from the data deduplication computing subsystem 102. For example, SIS computing subsystem 104 may receive the data segment (e.g., via network 206).

At step 414, the data segment may be stored to the SIS data store 124. For example, SIS computing subsystem 104 may store the data segment to the SIS data store 124.

At step 416, the fingerprint data 126 may be updated. For example, SIS computing subsystem 104 may update the fingerprint data 126 to include the fingerprint corresponding to the data segment stored to the SIS data store 124 at step 414.

At step 409, fingerprint usage data 128 may be updated. For example, SIS computing subsystem 104 may update fingerprint usage data 128 to include information descriptive of or otherwise associated with the search for the fingerprint in the fingerprint data 126 at step 404 and/or the addition of the fingerprint to the fingerprint data at step 416. For example, the fingerprint usage data 128 may be updated to include information about the search for the fingerprint in the fingerprint data 126, information about a data storage request that caused the search to be performed, information about a data selection (e.g., a set of data being backed up) associated with the request, information about a client-side subsystem and/or device associated with the request (e.g., an identifier for data deduplication computing subsystem 102), statistical information related to the search for the fingerprint in the fingerprint data 126 (e.g., add a "miss" to statistical information for the fingerprint), and/or any other information related to the use of (e.g., search for and/or addition of) the fingerprint. The method 400 may then end, and may be repeated for another query and fingerprint corresponding to another data segment.

Figure 5:
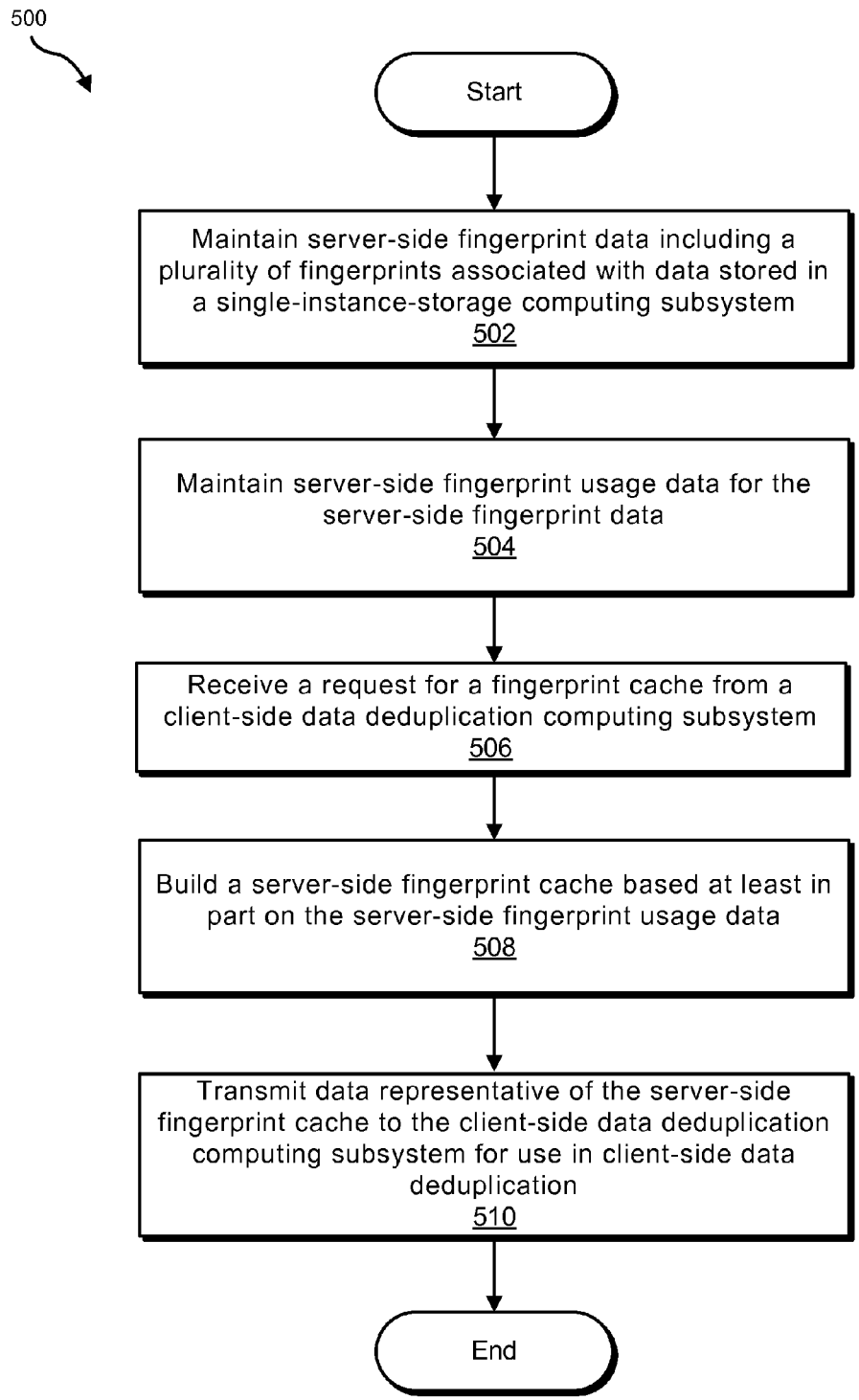
FIG. 5 is a flow diagram of an exemplary server-side method for seeding a fingerprint cached for data deduplication according to at least one embodiment.

Fingerprint usage data 128 may be used by SIS computing subsystem 104 to seed a fingerprint cache for use in data deduplication operations, including client-side data deduplication operations performed by data deduplication computing subsystem 102. FIG. 5 is a flow diagram of an exemplary method 500 of seeding a fingerprint cache for use in data deduplication operations. While FIG. 5 illustrates exemplary steps according to one embodiment, other embodiments may omit, add to, reorder, and/or modify any of the steps shown in FIG. 5.

As illustrated in FIG. 5, at step 502 server-side fingerprint data (which may include a plurality of fingerprints associated with data stored in a single-instance-storage computing subsystem) may be maintained. For example, SIS computing subsystem 104 may maintain server-side fingerprint data 126, which may include a plurality of fingerprints 304 associated with data stored in SIS data store 124 of SIS computing subsystem 104, as described above.

At step 504, server-side fingerprint usage data for the server-side fingerprint data may be maintained. For example, SIS computing subsystem 104 may maintain server-side fingerprint usage data 128 associated with fingerprint data 126, as described above.

At step 506, a request for a fingerprint cache may be received. For example, SIS computing subsystem 104 may receive a request for a fingerprint cache from data deduplication computing subsystem 102, which, as will be described in more detail further below, may have initiated the request in response to a request to store a selection of local data 114 to SIS data store 124.

At step 508, a server-side fingerprint cache may be built based at least in part on the server-side fingerprint usage data. For example, SIS computing subsystem 104 may build fingerprint cache 130 based at least in part on the fingerprint usage data 128 maintained in storage device 122.

SIS computing subsystem 104 may be configured to build fingerprint cache 130 based at least in part on the fingerprint usage data 128 in any manner suitable for generating a fingerprint cache 130 that includes a set of fingerprints that are likely to be used for one or more data deduplication operations. As used herein, the phrase "likely to be used for data deduplication operations" may refer to a determination and/or calculated likelihood that one or more fingerprints will be used for one or more data deduplication operations. The determination and/or calculated likelihood may be defined as may suit a particular application and that is configured to facilitate building of a fingerprint cache configured to have a high hit rate (i.e., high locality of data) when utilized for one or more data deduplication operations.

As an example, SIS computing subsystem 104 may query fingerprint usage data 128 to identify a list of fingerprints included in the fingerprint data 126 and that as associated with a particular client device and/or a backup of a data selection initiated by a particular client device. For instance, SIS computing subsystem 104 may search the fingerprint usage data 128 for an identifier associated with the client device and/or the data selection. This search may identify a set of fingerprint usage information from which one or more fingerprints associated with the client device and/or data selection may be identified. SIS computing subsystem 104 may access the identified fingerprints in the fingerprint data 126 and compile a list of identified fingerprints for inclusion in fingerprint cache 130. Hence, SIS computing subsystem 104 may use the list of identified fingerprints to build a fingerprint cache (e.g., fingerprint cache 130) that is likely to have a high hit rate for a future backup of the data selection and/or a future backup by the client device. Accordingly, the fingerprint cache may be well-suited for use in data deduplication operations performed by the client device.

In at least one embodiment, step 508 may be performed in response to the request for the fingerprint cache received in step 506. In at least one other embodiment, step 508 may be performed in advance of receipt of a request for a fingerprint cache. For example, SIS computing subsystem 104 may be configured to maintain fingerprint cache 130, such as by continually updating fingerprint cache 130 in a background process to reflect changes made to data stored in SIS data store 124 and fingerprints 304 associated with the data. Accordingly, a fingerprint cache may be built and ready to be sent when requested by a client subsystem or device (e.g., data deduplication computing subsystem 102). In such an embodiment, step 508 may be performed in advance of step 506, and step 510 may be performed in response to the request for the fingerprint cache received in step 506.

At step 510, data representative of the server-side fingerprint cache built in step 508 may be transmitted to a client-side data deduplication computing subsystem for use in client-side data deduplication. For example, SIS computing subsystem 104 may transmit data representative of the fingerprint cache to data deduplication computing subsystem 102 (e.g., via network 206) for use by the data deduplication computing subsystem 102 in client-side data deduplication operations. The fingerprint cache may be transmitted as a whole to data deduplication computing subsystem 102 in response to a single request received from data deduplication computing subsystem 102. As described above, the fingerprint cache may be seeded such that is it well-initialized and well-suited for use in data deduplication operations performed by data deduplication computing subsystem 102.

Upon completion of step 510, exemplary method 500 in FIG. 5 may terminate. Exemplary client-side data deduplication operations and utilization of a fingerprint cache for the client-side data deduplication operations are described in more detail further below.

By SIS computing subsystem 104 seeding a fingerprint cache 130 at a server-side of system 100 and transmitting data representative of the fingerprint cache 130 to data deduplication computing subsystem 102 for use in client-side data deduplication operations, computing resources may be conserved. For example, data deduplication computing subsystem 102 may rely on server-side-seeded fingerprint cache rather than having overhead associated with initializing such a fingerprint cache locally, which is generally less efficient at least because local initialization of a fingerprint cache by data deduplication computing subsystem 102 may require that data deduplication computing subsystem 102 send excessive queries to SIS computing subsystem 104.

One or more of the steps shown in FIG. 4 and/or FIG. 5 may be performed by one or more components of SIS computing subsystem 104, such as by deduplication server 120 executing one or more of the steps and/or directing one or more other components of SIS computing subsystem 104 to execute one or more of the steps. Deduplication server 120 may include or be implemented as hardware, computing instructions (e.g., software) embodied on at least one computer-readable medium, or a combination thereof. In at least one embodiment, for example, deduplication server 120 may include a software application tangibly embodied on a computer-readable-storage medium (e.g., storage device 122) and configured to direct SIS computing subsystem 104 to perform one or more of the steps shown in FIG. 4 and/or FIG. 5.

Figure 6:
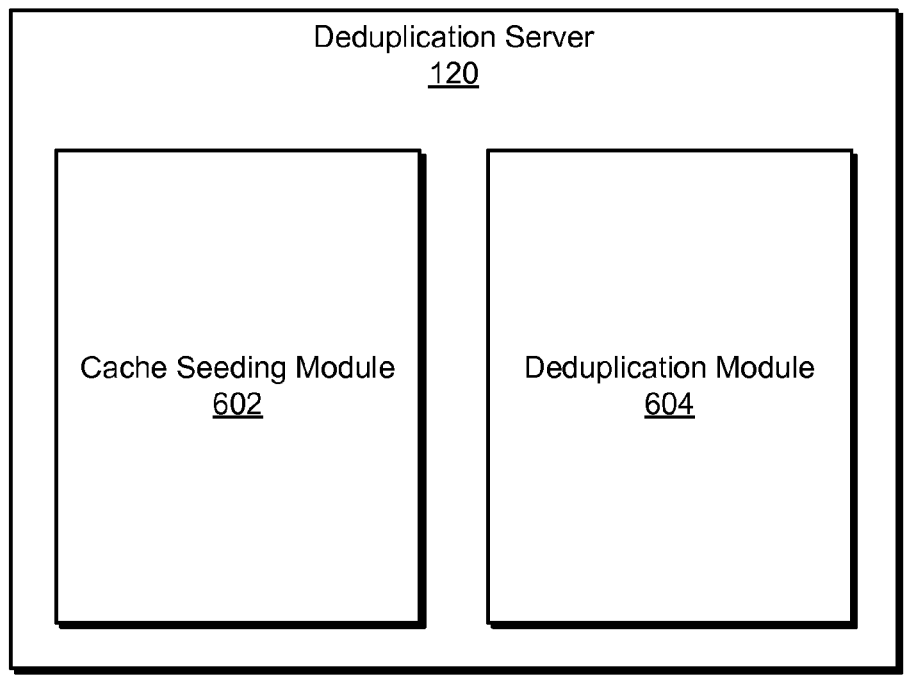
FIG. 6 is a block diagram of exemplary modules of a deduplication server according to at least one embodiment.
Figure 8:
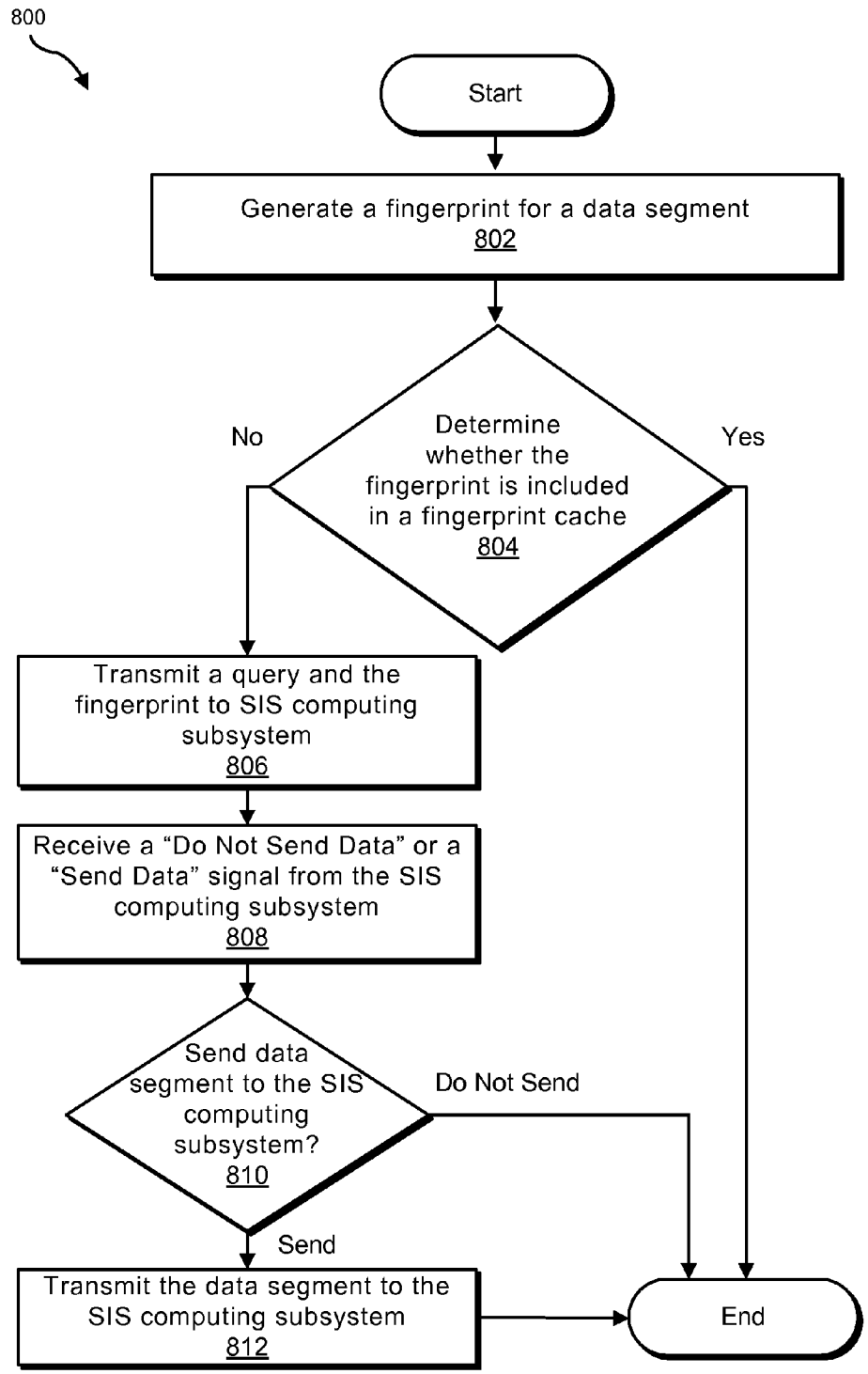

FIG. 6 illustrates exemplary modules that may be included in deduplication server 120 and configured to perform and/or direct one or more components of SIS computing subsystem 104 to perform one or more of the server-assisted deduplication operations described above. The modules may be implemented in any suitable way, including as computing instructions tangibly embodied on a computer-readable-storage medium (e.g., as components of a software application). As shown in FIG. 8, deduplication server 120 may include a cache seeding module 602 configured to perform and/or direct one or more components of SIS computing subsystem 104 to perform one or more of the operations related to maintaining fingerprint usage data 128, building one or more fingerprint caches 130 based on the fingerprint usage data 128, and transmitting one or more fingerprint caches 130 to data deduplication computing subsystem 102 for use by data deduplication computing subsystem 102 in one or more client-side data deduplication operations, as described above. Deduplication server 120 may also include a deduplication module 604 configured to perform and/or direct one or more components of SIS computing subsystem 104 to perform one or more of the server-assisted deduplication operations described above.

In some examples, fingerprint data 126 may be loaded into cache memory 121 for access by deduplication server 120 to search for and compare fingerprints in the fingerprint data 126 and/or to build fingerprint cache 130, as described above. Cache memory 121 may represent any temporary computing memory.

Alternative or in addition to one or more of the server-assisted deduplication operations described above, data deduplication computing subsystem 102 may perform client-side data deduplication operations related to requests to store data to SIS data store 124. In at least one embodiment, one or more of the steps shown in FIG. 4 and/or FIG. 5 may be performed in conjunction with one or more client-side data deduplication operations. For example, SIS computing subsystem 104 may perform one or more of the steps of FIG. 4 to verify determinations made by client-side data deduplication operations. As another example, SIS computing subsystem 104 may perform one or more steps of FIG. 4 when data deduplication computing subsystem 102 lacks information to make data deduplication determinations. As yet another example, SIS computing subsystem 102 may perform one or more steps of FIG. 4 and/or FIG. 5 in conjunction with a request by data deduplication computing subsystem 102 to store data to SIS data store 124. Exemplary client-side data deduplication operations will now be described with reference to exemplary components of data deduplication computing subsystem 102.

Returning again to FIG. 1, storage device 112 of data deduplication computing subsystem 102 may generally represent any type or form of data storage device and/or medium (e.g., a computer-readable storage medium), such as the storage devices illustrated and described in connection with FIGS. 9 and 10. Storage device 112 may comprise one or more storage devices that are accessible to data deduplication computing subsystem 102, including one or more store devices included within data deduplication client device 202 of FIG. 2 and/or located remotely of data deduplication client device 202 (e.g., a network attached storage (NAS) or storage area network (SAN)). As mentioned above, storage device 112 may include local data 114. Local data 114 may include any data stored on storage device 112 of data deduplication computing subsystem 102, including various data that may be generated and/or consumed by a user of data deduplication computing subsystem 102. For example, local data 114 may include data files, media files, and executable files, such as those used to implement software applications and operating systems, as well as files that are used or generated by such executable files, including files generated by user applications (e.g., word processing programs, email programs, graphics programs, database applications, or the like) executing on data deduplication computing subsystem 102. As another example, local data 114 may include data in a registry and/or file system of a computing device.

One or more selections of data in the local data 114 may be marked for storage (e.g., backup) to SIS data store 124 of SIS computing subsystem 104. A data selection may comprise a logical data set marked for storage to SIS data store 124 of SIS computing subsystem 104. As used herein, "marked for storage" may refer to current and/or scheduled future events for storage of a data selection to SIS data store 124. For instance, a user may mark a data selection for current backup and/or scheduled future backup. Scheduled backup may include a one-time backup of a data selection scheduled at a future date and/or a schedule of recurring periodic backups of a data selection. A request to store a data selection to SIS computing subsystem 104 may be initiated by a user of data deduplication computing subsystem 102 marking the data selection for storage (e.g., backup) to SIS computing subsystem 104.

Storage of a data selection included in local data 114 to SIS computing subsystem 104 is illustrative only. One or more of the deduplication operations described herein may be similarly performed for storage of data selections from other sources to SIS computing subsystem 104. For example, a data selection (e.g., a stream of data) may be pushed from an external source (e.g., from an external device, which may include a third-party device) to data deduplication computing subsystem 102 (e.g., over network 206) for deduplication and storage to SIS data store 124. As another example, data deduplication computing subsystem 102 may generate and provide a data selection (e.g., a data stream and/or a log file) for deduplication and storage to SIS data store 124 without the data selection first being stored in storage device 112, such that the data selection does not originate from the storage device 112.

Figure 7:
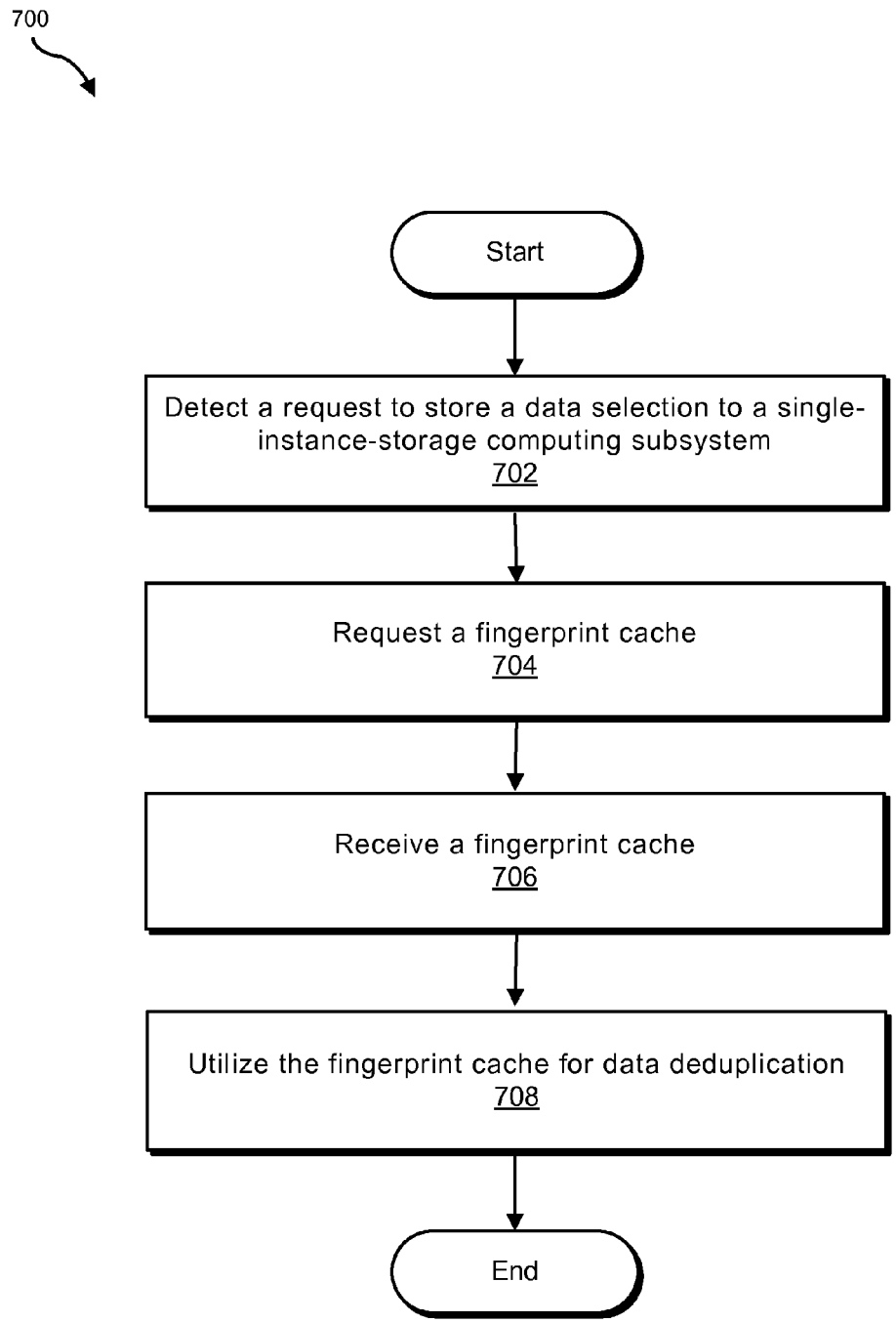
FIGS. 7-8 are flow diagrams of an exemplary method for client-side data deduplication according to at least one embodiment.

FIGS. 7-8 are flow diagrams of an exemplary client-side data deduplication method 700. While FIGS. 7-8 illustrate exemplary steps according to one embodiment, other embodiments may omit, add to, reorder, and/or modify any of the steps shown in FIGS. 7-8. For example, in at least one embodiment, steps 806, 808, and 810 may be skipped or omitted from method 800.

As illustrated in FIG. 7, at step 702 a request to store a data selection to a SIS computing subsystem may be detected. For example, data deduplication computing subsystem 102 may detect the request to store the data selection to SIS computing subsystem 104. Data deduplication computing subsystem 102 may detect the request in any suitable way, including by detecting a predefined event, which may include receipt of user input identifying the data selection and/or requesting that the data selection be stored (e.g., backed up) to SIS computing subsystem 104 or initialization of a scheduled data storage (e.g., data backup) process at a predetermined time.

At step 704, a fingerprint cache may be requested. For example, data deduplication computing subsystem 102 may request a fingerprint cache from SIS computing subsystem 104. This may include data deduplication computing subsystem 102 transmitting the request and/or related data to SIS computing subsystem 104 (e.g., via network 206). SIS computing subsystem 104 may respond to the request as described above (e.g., by building and/or transmitting data representative of a server-side fingerprint cache to data deduplication computing subsystem 102).

At step 706, a fingerprint cache may be received. For example, data deduplication computing subsystem 102 may receive data representative of a server-side fingerprint cache from SIS computing subsystem 104 (e.g., via network 206).

At step 708, the fingerprint cache may be utilized for client-side data deduplication. Upon completion of step 708, exemplary method 700 in FIG. 7 may terminate. An example of utilization of a fingerprint cache (e.g., the server-side seeded fingerprint cache received in step 706) for data deduplication will now be described in reference to FIG. 8

As illustrated in FIG. 8, at step 802 a fingerprint for a data segment in a data selection may be generated. For example, data deduplication computing subsystem 102 may calculate the fingerprint in any of the ways mentioned herein (e.g., in accordance with a checksum, hash, or fingerprint-generation heuristic). The data selection may comprise a set of local data 114 marked for storage to SIS data store 124.

At step 804, a determination may be made as to whether the fingerprint generated in step 802 is included in a fingerprint cache. For example, data deduplication computing subsystem 102 may determine whether the fingerprint is included in the server-side-seeded fingerprint cache 130 received from SIS computing subsystem 104 in step 706 of FIG. 7, such as by searching the fingerprint cache 130 for a fingerprint matching the fingerprint generated in step 802.

If the fingerprint is determined to be in the fingerprint cache at step 804, the method 800 may end, and may be repeated for another data segment in the data selection. This determination may indicate that the data segment associated with the fingerprint is already stored in SIS data store 124. Accordingly, data deduplication computing subsystem 102 may not send the data segment, a query, or a fingerprint associated with the data segment to SIS computing subsystem 104. This may help reduce traffic between data deduplication computing subsystem 102 and SIS computing subsystem 104, which may help reduce demands on network bandwidth and/or processing demands at the SIS computing subsystem 104.

On the other hand, if the fingerprint is determined not to be in the fingerprint cache at step 804, at step 806 a query and the fingerprint may be transmitted to SIS computing subsystem 104. For example, data deduplication computing subsystem 102 may transmit the query and fingerprint to SIS computing subsystem 104, which may be configured to perform server-assisted deduplication based on the query and the fingerprint as described above in reference to FIG. 4, which may include transmitting a "Do Not Send Data" or a "Send Data" signal to data deduplication computing subsystem 102 based on whether SIS computing subsystem 104 determines that the data segment associated with the fingerprint is already stored in SIS data store 124.

At step 808, a "Do Not Send Data" or a "Send Data" signal may be received from the SIS computing subsystem 104. For example, data deduplication computing subsystem 102 may receive a "Do Not Send Data" or a "Send Data" signal from the SIS computing subsystem 104.

At step 810, a determination may be made as to whether to send the data segment to the SIS computing subsystem 104. For example, data deduplication computing subsystem 102 may determine whether to send the data segment to the SIS computing subsystem 104 based on the signal received from the SIS computing subsystem 104 in step 808.

If the determination at step 810 is to not send the data segment to SIS computing subsystem 104, the method 800 may end, and may be repeated for another data segment in the data selection. This determination may indicate that the SIS computing subsystem 104 has determined that the data segment associated with the fingerprint is already stored in SIS data store 124. Accordingly, data deduplication computing subsystem 102 may not send the data segment to the SIS computing subsystem 104. This may help reduce traffic between data deduplication computing subsystem 102 and SIS computing subsystem 104, which may help reduce demands on network bandwidth and/or processing demands at the SIS computing subsystem 104.

On the other hand, if the determination at step 810 is to send the data segment to SIS computing subsystem 104, the data segment may be transmitted to the SIS computing subsystem 104 at step 812. For example, data deduplication computing subsystem 102 may transmit the data segment to the SIS computing subsystem 104 (e.g., via network 206). The method 800 may then end, and may be repeated for another data segment in the data selection.

One or more of the steps shown in FIGS. 7-8 may be performed by one or more components of data deduplication computing subsystem 102, such as by deduplication client 108 executing one or more of the steps and/or directing one or more other components of data deduplication computing subsystem 102 to execute one or more of the steps. Deduplication client 108 may include or be implemented as hardware, computing instructions (e.g., software) embodied on at least one computer-readable medium, or a combination thereof. In at least one embodiment, for example, deduplication client 108 may include a software application tangibly embodied on a computer-readable-storage medium (e.g., storage device 112) and configured to direct data deduplication computing subsystem 102 to perform one or more steps shown in FIGS. 7-8.

In some examples, utilization of a fingerprint cache for data deduplication in step 810 of FIG. 8 may include loading the fingerprint cache 130 received in step 706 of FIG. 7 into cache memory 121 for access by deduplication client 108 to search for and compare fingerprints in the fingerprint cache. Cache memory 121 may represent any temporary computing memory.

One or more of the operations described above may include and/or cause transformation of data and/or at least one property of storage device 112 or storage device 122. For example, maintaining fingerprint usage data as described above may include or cause transformation of data and/or at least one property of storage device 122. As another example, building, transmitting, and/or utilizing one or more fingerprint caches for data deduplication as described above may include or cause transformation of data and/or at least one property of storage device 112 and/or storage device 122.

One or more of the methods and/or one or more of the steps in the methods described above may be repeated for subsequent requests to store the same data selection and/or one or more other data selections to SIS data store 124.

The examples of data-selection-specific data deduplication described above may provide for efficient data deduplication and may alleviate the demands placed by data deduplication on computing resources such as processing, memory storage, and/or network bandwidth resources. For example, by seeding and providing a well-initialized server-side fingerprint cache to data deduplication computing subsystem 102 for use in data deduplication operations, the demands of client-side data deduplication operations may generally be less than the demands of previous client-side data deduplication techniques in which client-side fingerprint caches are initialized locally. For example, queries from client-side to server-side devices associated with local initialization of a client-side fingerprint cache may be reduced or eliminated. In addition, client-side memory space may be freed up by not storing persistent copies of fingerprint caches at the client-side.

The exemplary fingerprint cache seeding data deduplication systems and methods described above may be implemented as may suit a particular application and/or environment. For example, FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may comprise at least one processor 914 and a system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the seeding, receiving, determining, transmitting, storing, updating, maintaining, adding, deleting, building, detecting, requesting, initializing, generating, sending, and utilizing steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may comprise both a volatile memory unit (such as, for example, system memory 916) and a non-volatile storage device (such as, for example, primary storage device 932, as described in detail below).

In certain embodiments, exemplary computing system 910 may also comprise one or more components or elements in addition to processor 914 and system memory 916. For example, as illustrated in FIG. 9, computing system 910 may comprise a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller may perform and/or be a means for performing, either alone or in combination with other elements, one or more of the steps or features described and/or illustrated herein, such as seeding, receiving, determining, transmitting, storing, updating, maintaining, adding, deleting, building, detecting, requesting, initializing, generating, sending, and utilizing.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for performing, either alone or in combination with other elements, one or more of the seeding, receiving, determining, transmitting, storing, updating, maintaining, adding, deleting, building, detecting, requesting, initializing, generating, sending, and utilizing steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network comprising additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 994 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the seeding, receiving, determining, transmitting, storing, updating, maintaining, adding, deleting, building, detecting, requesting, initializing, generating, sending, and utilizing steps disclosed herein. Communication interface 922 may also be used to perform and/or be a means for performing other steps and features set forth in the instant disclosure.

Figure 9:
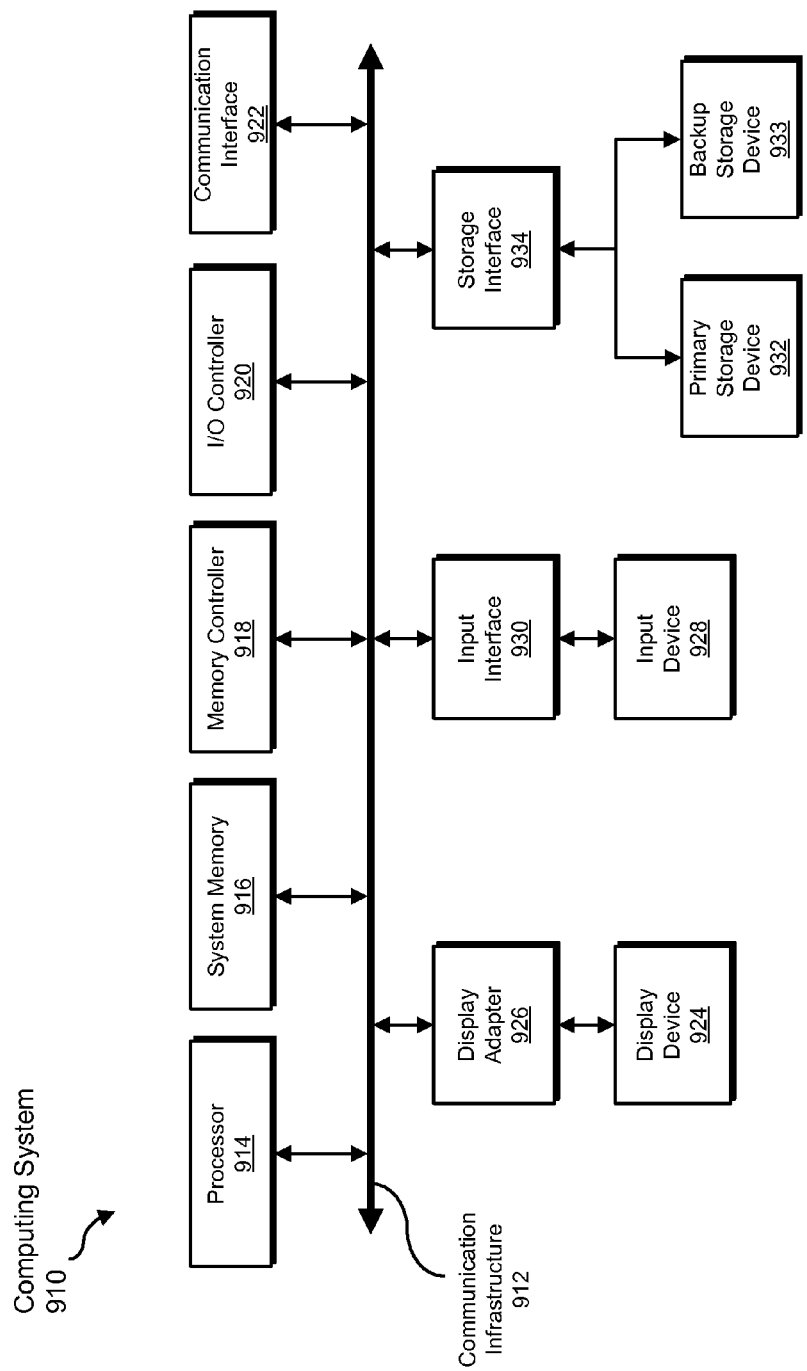
FIG. 9 is a block diagram of an exemplary computing system capable of implementing one or more of the embodiments described and/or illustrated herein.

As illustrated in FIG. 9, computing system 910 may also comprise at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also comprise at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the seeding, receiving, determining, transmitting, storing, updating, maintaining, adding, deleting, building, detecting, requesting, initializing, generating, sending, and utilizing steps disclosed herein. Input device 928 may also be used to perform and/or be a means for performing other steps and features set forth in the instant disclosure.

As illustrated in FIG. 9, exemplary computing system 910 may also comprise a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also comprise other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

In certain embodiments, storage devices 932 and 933 may be used, for example, to perform and/or be a means for performing, either alone or in combination with other elements, one or more of the seeding, receiving, determining, transmitting, storing, updating, maintaining, adding, deleting, building, detecting, requesting, initializing, generating, sending, and utilizing steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" or "computer-readable-storage medium" generally refers to any form of device, carrier, or medium capable of storing or carrying and/or storing computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

Figure 10:
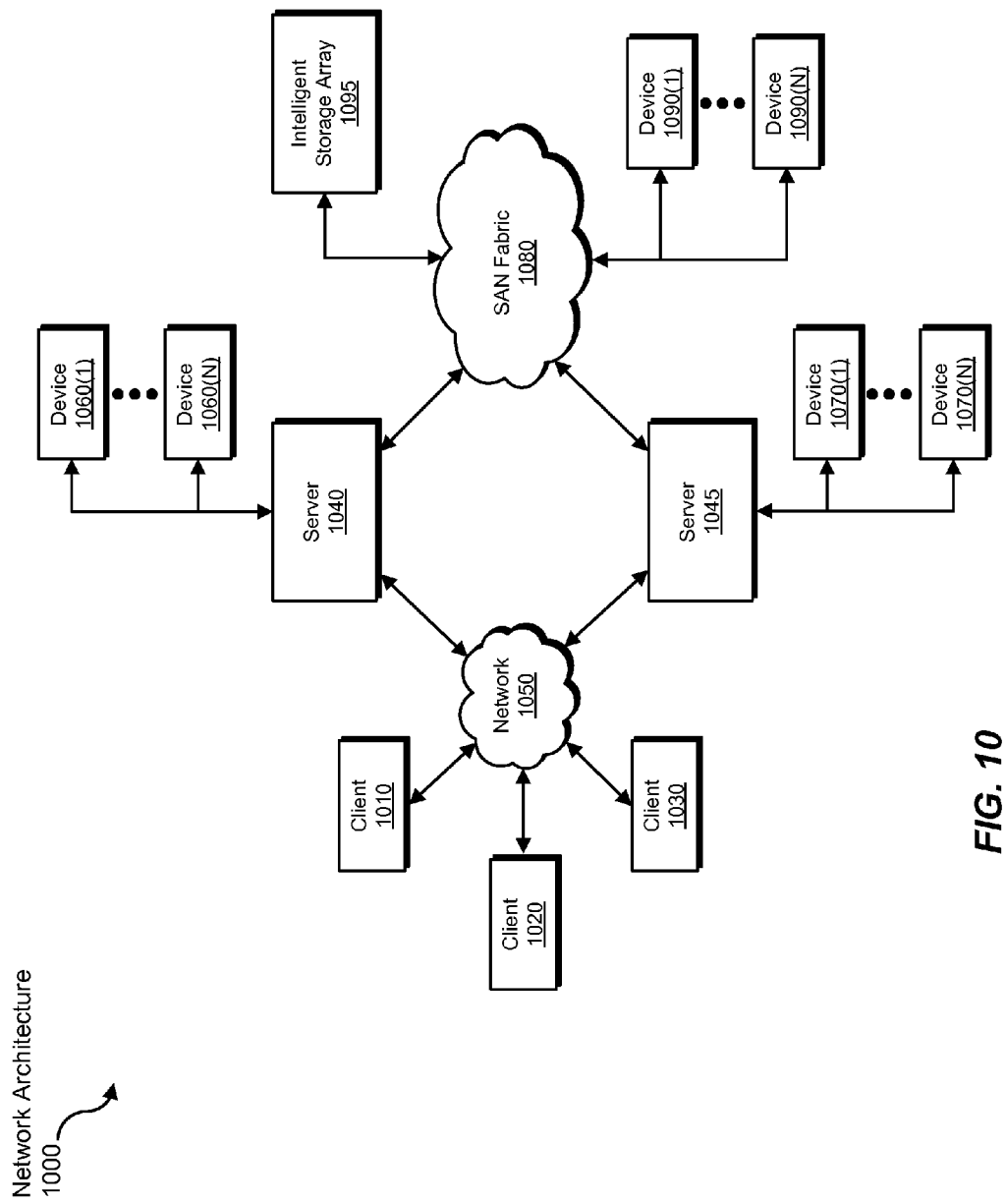
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for seeding, receiving, determining, transmitting, storing, updating, maintaining, adding, deleting, building, detecting, requesting, initializing, generating, sending, and utilizing steps disclosed herein. Network architecture 1000 may also be used to perform and/or be a means for performing other steps and features set forth in the instant disclosure.

While certain examples described above illustrate a single client-side data deduplication computing subsystem 102 in communication with server-side SIS computing subsystem 104, this is illustrative only and not limiting in any sense. In certain embodiments, multiple client-side data deduplication computing subsystems 102 may be in communication with server-side SIS computing subsystem 104, which may be configured to seed one or more well-initialized server-side fingerprint caches as described above for use by one or more of the multiple client-side data deduplication computing subsystems 102.

While certain examples described above illustrate a single server-side fingerprint cache 130 built by SIS computing subsystem 104, this is illustrative only and not limiting in any sense. In certain embodiments, SIS computing subsystem 104 may build and/or maintain multiple well-initialized server-side fingerprint caches for use by client-side data deduplication operations. For example, SIS computing subsystem 104 may build and/or maintain a well-initialized server-side fingerprint caches for use by each data deduplication computing subsystem 102 and/or data deduplication client device 202 in communication with SIS computing subsystem 104.

Network architecture 1000, or another network architecture, may be used to implement one or more embodiments that include multiple deduplication servers and/or multiple SIS data stores. For example, multiple SIS data stores included in one or more data storage devices may form one logical SIS data store or separate logical SIS data stores. Additionally or alternatively, multiple deduplication servers may be in connection with one or multiple SIS data stores. In some examples, each of the deduplication servers may be responsible for a subset of data in an SIS data store. In other examples, each of the deduplication servers may be responsible for data in a separate SIS data store, and the separate SIS data stores may form one logical SIS data store. In some examples, a data deduplication computing subsystem may communicate with one or more of the deduplication servers.

As detailed above, computing system 910 and/or one or more components of network architecture 1000 may perform and/or be a means for performing, either alone or in combination with other elements, one or more steps of an exemplary method for seeding a fingerprint cache for data deduplication associated with a single-instance-storage computing subsystem such as SIS computing subsystem 104. In one example, a method for performing such a task may comprise: 1) maintaining server-side fingerprint usage data for a plurality of fingerprints associated with data stored in the single-instance-storage computing subsystem and 2) building, based at least in part on the fingerprint usage data, a server-side fingerprint cache for use in client-side data deduplication, the server-side fingerprint cache comprising at least a subset of the plurality of fingerprints.

In some examples, the building step may comprise identifying, based at least in part on the fingerprint usage data, at least a subset of the plurality of fingerprints as likely to be used for the client-side data deduplication. In some examples, the building step may comprise identifying, based at least in part on the fingerprint usage data, at least a subset of the plurality of fingerprints as being associated with at least one of a client-side data deduplication computing subsystem, a data storage request, and a data selection corresponding to a data storage request.

In some examples, the method may also comprise: 1) receiving a request for the server-side fingerprint cache from a client-side data deduplication computing subsystem and 2) transmitting data representative of the server-side fingerprint cache to the client-side data deduplication computing subsystem for use in client-side data deduplication associated with the single-instance-storage computing subsystem. In some examples, the building and the transmitting of the server-side fingerprint cache may be performed in response to the request. In other examples, the building of the server-side fingerprint cache may be performed in advance of the receiving of the request and the transmitting of the server-side fingerprint cache to the client-side data deduplication computing subsystem may be performed in response to the request. In some examples, the building of the server-side fingerprint cache may comprise continually updating the server-side fingerprint cache in a background process based at least in part on the fingerprint usage data.

In some examples, the fingerprint usage data may indicate an association between a client-side data deduplication computing subsystem and each of the fingerprints included in at least a subset of the plurality of fingerprints.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature at least because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for seeding a fingerprint cache for data deduplication associated with a single-instance-storage computing subsystem, at least a portion of the method being performed by a server-side computing device comprising at least one processor, the method comprising:

maintaining server-side fingerprint usage data for a plurality of fingerprints associated with data stored in the single-instance-storage computing subsystem;

building, based at least in part on the fingerprint usage data, a server-side fingerprint cache for use in client-side data deduplication in connection with the single-instance-data storage computing subsystem, the server-side fingerprint cache comprising at least a subset of the plurality of fingerprints;

receiving a request for an initialized fingerprint cache from a client-side data deduplication subsystem that has yet to fully initialize a local client-side fingerprint cache for use in client-side data deduplication in connection with the single-instance-storage computing subsystem;

transmitting the server-side fingerprint cache, as a whole, to the client-side data deduplication computing subsystem in order to enable the client-side data deduplication subsystem to avoid having to fully initialize the local client-side fingerprint cache.

2. The method of claim 1, wherein the building of the server-side fingerprint cache based at least in part on the fingerprint usage data comprises identifying, based at least in part on the fingerprint usage data, the at least a subset of the plurality of fingerprints as likely to be used for client-side data deduplication in connection with the single-instance-storage computing subsystem.

3. The method of claim 1, wherein the building of the server-side fingerprint cache based at least in part on the fingerprint usage data comprises identifying, based at least in part on the fingerprint usage data, the at least a subset of the plurality of fingerprints as being associated with at least one of the client-side data deduplication computing subsystem, a data storage request, and a data selection corresponding to the data storage request.

4. The method of claim 1, wherein the building and the transmitting of the server-side fingerprint cache are performed in response to the request.

5. The method of claim 1, wherein:
the building of the server-side fingerprint cache is performed in advance of the receiving of the request;
the transmitting of the server-side fingerprint cache to the client-side data deduplication computing subsystem is performed in response to the request.

6. The method of claim 5, wherein the building of the server-side fingerprint cache comprises continually updating the server-side fingerprint cache in a background process based at least in part on the fingerprint usage data.

7. The method of claim 1, wherein the fingerprint usage data indicates an association between the client-side data deduplication computing subsystem and each of the fingerprints included in the at least a subset of the plurality of fingerprints.

8. A system for seeding a fingerprint cache for data deduplication, the system comprising:
at least one processor;
a deduplication server that directs the at least one processor to:
maintain server-side fingerprint usage data for a plurality of fingerprints associated with data stored in a single-instance data store;
build, based at least in part on the fingerprint usage data, a server-side fingerprint cache for use in client-side data deduplication in connection with the single-instance data store, the server-side fingerprint cache comprising at least a subset of the plurality of fingerprints;
receive a request for an initialized fingerprint cache from a client-side data deduplication subsystem that has yet to fully initialize a local client-side fingerprint cache for use in client-side data deduplication in connection with the single-instance data store;
transmit the server-side fingerprint cache, as a whole, to the client-side data deduplication computing subsystem in order to enable the client-side data deduplication subsystem to avoid having to fully initialize the local client-side fingerprint cache.

9. The system of claim 8, wherein the deduplication server directs the at least one processor to identify, based at least in part on the fingerprint usage data, the at least a subset of the plurality of fingerprints as likely to be used for the client-side data deduplication.

10. The system of claim 8, wherein the deduplication server directs the at least one processor to identify, based at least in part on the fingerprint usage data, the at least a subset of the plurality of fingerprints as being associated with at least one of the client-side data deduplication computing subsystem, a data storage request, and a data selection corresponding to the data storage request.

11. The system of claim 8, wherein the deduplication server directs the at least one processor to build and transmit the server-side fingerprint cache in response to the request.

12. The system of claim 8, wherein the deduplication server directs the at least one processor to:
build the server-side fingerprint cache in advance of the receipt of the request;
transmit the server-side fingerprint cache to the client-side data deduplication computing subsystem in response to the request.

13. The system of claim 12, wherein the deduplication server directs the at least one processor to continually update the server-side fingerprint cache in a background process based at least in part on the fingerprint usage data.

14. A non-transitory computer-readable-storage medium comprising one or more computer-executable instructions that, when executed by a computing device comprising at least one processor, cause the computing device to:
maintain server-side fingerprint usage data for a plurality of fingerprints associated with data stored in a single-instance data store;
build, based at least in part on the fingerprint usage data, a server-side fingerprint cache for use in client-side data deduplication in connection with the single-instance data store, the server-side fingerprint cache comprising at least a subset of the plurality of fingerprints;
receive a request for an initialized fingerprint cache from a client-side data deduplication subsystem that has yet to fully initialize a local client-side fingerprint cache for use in client-side data deduplication in connection with the single-instance data store;
transmit the server-side fingerprint cache, as a whole, to the client-side data deduplication computing subsystem in order to enable the client-side data deduplication subsystem to avoid having to fully initialize the local client-side fingerprint cache.

15. The non-transitory computer-readable-storage medium of claim 14, wherein the one or more computer-executable instructions further cause the computing device to identify, based at least in part on the fingerprint usage data, the at least a subset of the plurality of fingerprints as likely to be used for client-side data deduplication in connection with the single-instance data store.

16. The non-transitory computer-readable-storage medium of claim 14, wherein the one or more computer-executable instructions further cause the computing device to identify, based at least in part on the fingerprint usage data, the at least a subset of the plurality of fingerprints as being associated with the client-side data deduplication computing subsystem.

17. The non-transitory computer-readable-storage medium of claim 14, wherein the one or more computer-executable instructions further cause the computing device to continually update the server-side fingerprint cache in a background process based at least in part on the fingerprint usage data.

* * * * *